US010746525B2

(12) United States Patent
Konyndyk

(10) Patent No.: US 10,746,525 B2
(45) Date of Patent: Aug. 18, 2020

(54) CAPACITIVE-SENSING PAINT BORER

(71) Applicant: The Boeing Company, Chicago, IL (US)

(72) Inventor: David M. Konyndyk, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 243 days.

(21) Appl. No.: 15/958,846

(22) Filed: Apr. 20, 2018

(65) Prior Publication Data
US 2019/0323817 A1 Oct. 24, 2019

(51) Int. Cl.
G01B 7/06 (2006.01)
G08B 21/18 (2006.01)
G01B 5/06 (2006.01)

(52) U.S. Cl.
CPC ............ *G01B 7/085* (2013.01); *G01B 5/066* (2013.01); *G08B 21/182* (2013.01)

(58) Field of Classification Search
CPC ...... G01B 7/085; G01B 5/066; G08B 21/182; G01R 27/2605
USPC ......................................... 324/671
See application file for complete search history.

(56) References Cited

U.S. PATENT DOCUMENTS

| 3,342,089 A * | 9/1967 | Palm .................... B25H 1/0071 408/76 |
| 5,121,068 A * | 6/1992 | Baker ....................... G01B 7/08 324/671 |
| 5,241,280 A * | 8/1993 | Aidun .................... G01B 7/105 324/230 |
| 7,650,699 B2 * | 1/2010 | Yamamoto .............. B23B 49/00 33/334 |
| 10,072,492 B2 * | 9/2018 | DiGiovanni ........ E21B 47/0006 |
| 10,485,094 B1 * | 11/2019 | Isohatala ............... G06F 3/0443 |
| 2010/0301866 A1 * | 12/2010 | Blessum ................ G01V 3/088 324/326 |
| 2012/0084056 A1 * | 4/2012 | Bucher ............. G01B 11/0608 702/172 |
| 2016/0151120 A1 * | 6/2016 | Kostrzewski .......... A61B 34/30 606/130 |
| 2017/0296204 A1 * | 10/2017 | Matsuura ............... A61B 17/17 |

OTHER PUBLICATIONS

ASTM, Standard Practices for Measurement of Dry Film Thickness of Protective Coating Systems by Destructive, Cross-Sectioning Means (Year: 2017).*
Erichsen, Tech. Description of Paint Borer 518 USB, Paint Borer 518 MC, and Paintxplorer 548 (Year: 2017).*

* cited by examiner

*Primary Examiner* — Tung X Nguyen
*Assistant Examiner* — Robert P Alejnikov, Jr.
(74) *Attorney, Agent, or Firm* — MH2 Technology Law Group LLP

(57) ABSTRACT

A boring apparatus including a drill having a drill bit; a capacitance sensor; and an alarm; wherein the capacitance sensor is electrically connected to the drill bit and detects a change in capacitance associated with a substrate material in proximity to the drill bit.

20 Claims, 3 Drawing Sheets

CAPACITIVE-SENSING PAINT BORER

BACKGROUND

Measurement of paint or coating thickness on a target surface is an important objective for many industries. For example, in the aerospace industry, the overall weight and distribution of paint on aircraft surfaces may impact the aircraft's performance and efficiency.

Some methods for measuring paint thickness use tools, such as cutting wedges, drills, or grinding disks, to cut through the various layers of paint over a substrate in a target surface. The angle of the cut and the apparent visible width of each paint layer can then be used to calculate the actual thickness of each layer. Representative measurements over a surface area can then be used to determine the overall thickness and distribution of the paint over the entire surface area.

However, conventional tools used for cutting through the various paint layers may often over-penetrate or deform the underlying substrate. This is especially impactful when hundreds of measurements, and therefore hundreds of cuts, may be needed to measure paint thickness over a large target surface.

Accordingly, there is a desire for paint thickness measuring tools, such as paint borers, that can cut through layers of paint over a substrate while reducing over-penetration into the underlying substrate.

BRIEF SUMMARY

This summary is intended merely to introduce a simplified summary of some aspects of one or more embodiments of the present disclosure. Further areas of applicability of the present invention will become apparent from the detailed description provided hereinafter. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities embodied in the present disclosure may be achieved by providing a boring apparatus including a drill having a drill bit; a capacitance sensor; and an alarm; wherein the capacitance sensor is electrically connected to the drill bit and detects a change in capacitance associated with a substrate material in proximity to the drill bit; wherein the capacitance sensor creates a sensor signal when the detected change in capacitance is greater than a threshold; and wherein the capacitance sensor is electrically connected to the alarm, and wherein the alarm creates an alarm signal upon receipt of the sensor signal from the capacitance sensor.

In another embodiment, the boring apparatus may further include a power source electrically connected to the drill, the capacitance sensor, and the alarm to supply electrical power to the drill, the capacitance sensor, and the alarm.

In another embodiment, the capacitance sensor detects the change in capacitance with respect to a baseline capacitance of the capacitance sensor.

In another embodiment, the change in capacitance greater than the threshold corresponds to direct contact with a material with a significant dielectric constant.

In another embodiment, the change in capacitance greater than the threshold corresponds to direct contact with a conductive material.

In another embodiment, the alarm creates at least one of an audible and a visual alarm signal upon receipt of the sensor signal.

In another embodiment, the boring apparatus further includes a connector to electrically connect the drill bit to the capacitance sensor.

In another embodiment, the connector includes a collet supporting the drill bit.

In another embodiment, the capacitance sensor includes an electrical brush electrically connected to the connector to create an electrical connection between the capacitance sensor and the drill bit.

The foregoing and/or other aspects and utilities embodied in the present disclosure may also be achieved by providing a capacitive-sensing boring apparatus, including a body; a power source assembly; a drill assembly including a drill bit; a capacitance sensor; and an alarm, wherein the power source assembly provides power to the drill assembly, the capacitance sensor, and the alarm, and wherein the capacitance sensor measures a change in capacitive load associated with a material in proximity to the drill bit, and creates a sensor signal when a threshold change in capacitance is detected, and wherein the alarm creates an alarm signal upon receipt of the sensor signal.

In another embodiment, the body includes a base configured to stably rest upon contoured surfaces.

In another embodiment, the base is a three-point base.

In another embodiment, the threshold change in capacitive load corresponds to direct contact between the drill bit and a conductive material.

In another embodiment, the threshold change in capacitive load corresponds to direct contact between the drill bit and a conductive composite material.

In another embodiment, the threshold change in capacitive load corresponds to direct contact between the drill bit and a material with a significant dielectric constant.

The foregoing and/or other aspects and utilities embodied in the present disclosure may also be achieved by providing a method of boring through a coating over a substrate, including boring a hole through one or more coating layers deposited over the substrate; wherein the substrate is conductive or has a significant dielectric constant and is capable of providing a significant capacitive load, and wherein the boring of the hole through the one or more coating layers comprises detecting a change in a capacitance associated with boring through the one or more coating layers and arriving at the substrate to prevent or reduce boring into the substrate.

In another embodiment, the detecting of the change in the capacitance corresponds to direct contact with the substrate during the boring of the hole through the one or more coating layers.

In another embodiment, the method further includes creating an alarm signal when the change in the capacitance is detected.

In another embodiment, the method further includes measuring at the hole bored through the one or more coating layers a thickness of the one or more coating layers deposited over the substrate.

In another embodiment, the boring of the hole uses a boring apparatus including a drill having a drill bit; a capacitance sensor; and an alarm; wherein the capacitance sensor is electrically connected to the drill bit and detects a change in capacitance associated with a substrate material in proximity to the drill bit; wherein the capacitance sensor creates a sensor signal when the detected change in capacitance is greater than a threshold; and wherein the capacitance sensor is electrically connected to the alarm, and wherein the alarm creates an alarm signal upon receipt of the sensor signal from the capacitance sensor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The accompanying drawings, which are incorporated in and constitute a part of this specification, illustrate embodiments of the present teachings. These and/or other aspects and advantages in the embodiments of the disclosure will become apparent and more readily appreciated from the following description of the various embodiments, taken in conjunction with the accompanying drawings of which.

Figure 1:
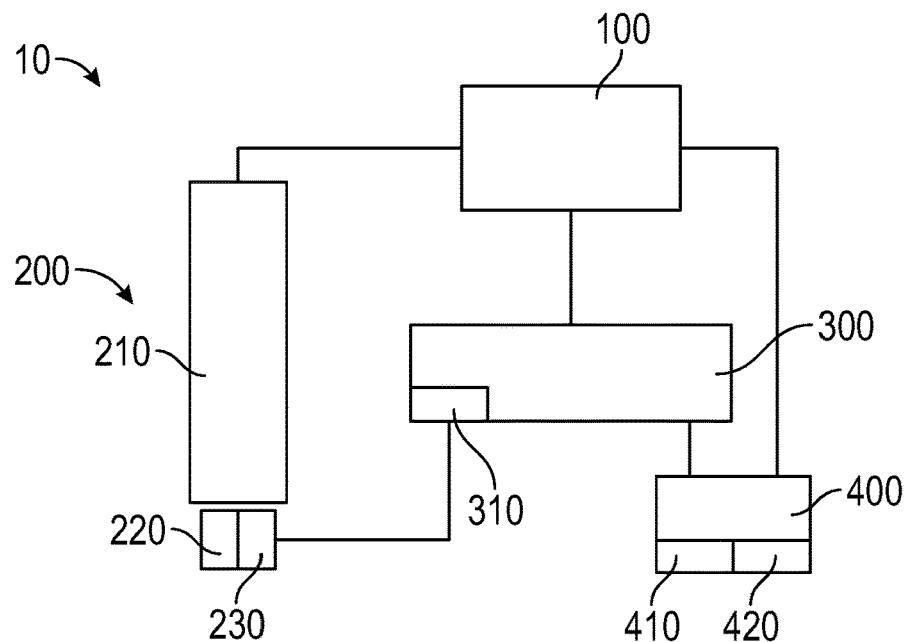
FIG. 1 illustrates a boring apparatus according to an exemplary embodiment.

These drawings/figures are intended to be explanatory and not restrictive.

DETAILED DESCRIPTION

Reference will now be made in detail to the various embodiments in the present disclosure, examples of which are illustrated in the accompanying drawings and figures. The embodiments are described below to provide a more complete understanding of the components, processes, compositions, and apparatuses disclosed herein. Any examples given are intended to be illustrative, and not restrictive. However, it will be apparent to one of ordinary skill in the art that the invention may be practiced without these specific details. In other instances, well-known methods, procedures, and components have not been described in detail so as not to unnecessarily obscure aspects of the embodiments.

Throughout the specification and claims, the following terms take the meanings explicitly associated herein, unless the context clearly dictates otherwise. The phrases "in some embodiments" and "in an embodiment" as used herein do not necessarily refer to the same embodiment(s), though they may. Furthermore, the phrases "in another embodiment" and "in some other embodiments" as used herein do not necessarily refer to a different embodiment, although they may. As described below, various embodiments may be readily combined, without departing from the scope or spirit of the present disclosure.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes embodiments containing A, B, or C, multiple examples of A, B, or C, or combinations of A/B, A/C, B/C, A/B/B/B/B/C, A/B/C, etc. In addition, throughout the specification, the meaning of "a," "an," and "the" include plural references. The meaning of "in" includes "in" and "on."

It will also be understood that, although the terms first, second, etc. may be used herein to describe various elements, these elements should not be limited by these terms. These terms are only used to distinguish one element from another. For example, a first object, component, or step could be termed a second object, component, or step, and, similarly, a second object, component, or step could be termed a first object, component, or step, without departing from the scope of the invention. The first object, component, or step, and the second object, component, or step, are both, objects, component, or steps, respectively, but they are not to be considered the same object, component, or step. It will be further understood that the terms "includes," "including," "comprises" and/or "comprising," when used in this specification, specify the presence of stated features, steps, operations, elements, and/or components, but do not preclude the presence or addition of one or more other features, steps, operations, elements, components, and/or groups thereof. Further, as used herein, the term "if" may be construed to mean "when" or "upon" or "in response to determining" or "in response to detecting," depending on the context.

When referring to any numerical range of values herein, such ranges are understood to include each and every number and/or fraction between the stated range minimum and maximum, as well as the endpoints. For example, a range of 0.5-6% would expressly include all intermediate values of, for example, 0.6%, 0.7%, and 0.9%, all the way up to and including 5.95%, 5.97%, and 5.99%, among many others. The same applies to each other numerical property and/or elemental range set forth herein, unless the context clearly dictates otherwise.

Additionally, all numerical values are "about" or "approximately" the indicated value, and take into account experimental error and variations that would be expected by a person having ordinary skill in the art. It should be appreciated that all numerical values and ranges disclosed herein are approximate valves and ranges, whether "about" is used in conjunction therewith.

With regard to procedures, methods, techniques, and workflows that are in accordance with some embodiments, some operations in the procedures, methods, techniques, and workflows disclosed herein may be combined and/or the order of some operations may be changed.

In today's aerospace industry, aircraft often include metallic or composite materials. For example, aircraft bodies and wing may be made of aluminum, titanium, and their alloys, and/or carbon fiber, fiberglass, and other composites.

Commonly, various coating or films are applied to these metallic or composite substrates for a variety of functional and cosmetic reasons. For example, paint primers may be applied to the initial metallic surface to protect against corrosion and to serve as a foundation for later, more decorative, paint coatings.

Where a paint primer is used, it is desirable to measure the thickness of the applied primer to ensure it has been uniformly applied throughout a target surface at a minimum thickness adequate to ensure corrosion protection of the underlying substrate without being so thick as to add unnecessary weight to the aircraft which may affect fuel efficiency. Similarly, if a topcoat of paint is applied, it is important to apply a specified coating thickness to ensure that acceptable appearance and performance criteria are met.

Paint thickness may also affect the overall lightning strike protection scheme of an aircraft. Metallic materials, conductive films, or wire-embedded laminates applied to composite substrates, assist in creating conductive paths of low resistance to direct lightning strikes away from sensitive areas. However, if excessive paint or film coatings applied to such substrates, it may increase the electrical resistance of the painted surface, which may impact the effectiveness of the as-designed lightning strike protection scheme of the substrates.

Paint or film thickness may be measured by cutting or boring through one or more paint (or film) layers until hitting the underlying metallic or composite substrate and analyzing the visible width of each paint layer to determine their thickness. For specific examples, see ASTM International Standard D4138 (re-approved 2017) "Standard Practices for Measurement of Dry Film Thickness of Protective Coating Systems by Destructive, Cross-Sectioning Means," ASTM International, West Conshohocken, Pa., 2006.

However, as mentioned above, conventional tools for cutting or boring through the paint layers may over-penetrate or deform the underlying metallic or composite substrate. Accordingly, the inventors have developed a new and inventive capacitive-sensing paint borer configured to cut through multiple coatings or films over a substrate in a target surface area while reducing a risk of over-penetration into the underlying substrate. In other embodiments, the capacitive-sensing paint borer may also lessen the training or experience required to use a paint borer, and may reduce the amount of time required to determine the film or paint thickness in a target surface area.

As used herein, the term underlying substrate may refer to the substrate material, the base material, or the surface material of a structure. For example, the underlying substrate may mean the main structural material forming a component of an aircraft which may be then covered with a film or paint.

FIG. 1 illustrates a capacitive-sensing boring apparatus according to an embodiment. As illustrated in FIG. 1, in one exemplary embodiment, a capacitive-sensing paint borer 10 includes a power source 100, a drill 200, a capacitance sensor 300, and an alarm 400.

The power source 100 may be an electrical power source, such as a battery or a power supply connected to the electrical grid. The power source 100 supplies power to the drill 200, the capacitance sensor 300, and the alarm 400. In one example, the power source 100 is a 9V alkaline battery. In other examples, the power source is a 9V rechargeable battery.

The drill may include a drill motor 210 and a drill bit 220. The drill motor 210 drives the drill bit 220 when supplied with power by the power source 100. The drill motor 210 and the drill bit 220 may be selected in view of the type of coating or layers to be drilled through and/or the type of underlying substrate. For example, the drill motor 210 and the drill bit 220 may be selected to easily drill through paint layers but not easily through a metallic or composite substrate. In one embodiment, the drill motor 210 is a DC micro motor, such as the FAULHABER 2237 CXR, 22 mm dia. brush DC micro motor. In certain embodiments, the drill bit is a configured to drill through up to 300 µm of paint or film thickness. For example, the drill bit may be a carbide steel drill bit with a dual cutting edge geometry. In other embodiments, the drill bit may comprise high speed steel. In some embodiments, the drill should have a torque of 100 mNm or greater.

The drill bit 220 may also be selected to facilitate the measurement of the thickness of the paint layers. For example, the drill bit 220 may be a conical drill bit configured to leave a conical bore hole through the paint layers, to ensure a suitable hole is drilled per the ASTM D4138 standard method. In one embodiment, the drill bit 220 has a cutting angle from 5 and 45 degrees. In other embodiments, the drill bit has a cutting angle from 10 to 30 degrees. In one embodiment, the cutting angle is about 14 degrees or about 26 degrees, for example, the drill bit 220 may have a cutting angle of 14 degrees or 26.6 degrees.

In some embodiments, the drill 200 may also include a connector 230 to electrically connect the drill bit 220 to the capacitance sensor 300. For example, the connector 230 may be embodied as a conductive collar or collet surrounding or supporting the drill bit 220. In one embodiment, the connector 230 is a brass collet configured to hold the drill bit 220.

The capacitance sensor 300 may be electrically connected to the drill bit 220 and may be configured to detect an object in contact with the drill bit 220 when supplied with power by the power source 100. For example, the capacitance sensor 300 may be configured to measure a change in capacitance between the drill bit 220 and an internal reference plane of the capacitance sensor 300. The capacitance sensor 300 may be configured to create a sensor signal when a threshold change in capacitance or capacitive load is measured. In certain embodiments, the threshold may be configured to differentiate between a dielectric and/or conductive object and a non-conductive or low conductivity layer. That is, in order to create the sensor signal, the object must alter an electrical field between the drill bit 220 and the capacitance sensor 300's ground plane by a threshold amount. For example, the threshold may be set to create a sensor signal when a change in capacitance is measured that corresponds to an underlying metallic or composite substrate. In certain embodiments, the capacitance sensor 300 does not create a sensor signal when the object is a non-conductive or low conductivity layer, such as a paint or non-conductive film. In certain embodiments, simply contacting of conventional paint or coating or fiberglass substrate by the drill bit 220 is not sufficient to meet the threshold.

In certain embodiments, the capacitance sensor 300 is an adaptive sensor configured to establish a baseline capacitance every time it is powered up, and the change in capacitance is measured against this baseline capacitance. In some embodiments, the capacitance sensor 300 includes one or more capacitors, and a capacitance threshold for the capacitance sensor 300 may adjusted by changing the one or more capacitors in the capacitance sensor 300. For example, the capacitance sensor 300 may include a touch sensor integrated circuit, such as the AT42QT1010 (QT1010) one-channel touch sensor IC, available commercially from ATMEL corp., headquartered in San Jose, Calif.

The capacitance sensor 300 may include an electrical brush 310 to contact the connector 230 of the drill 200 and establish an electrical connection. However, the present disclosure is not limited thereto, and other methods for electrically connecting the capacitance sensor 300 to the drill bit 220 are envisioned. For example, the capacitance sensor 300 may use slip rings, electrical rotary joints, etc. to electrically connect to the drill bit 220 or the drill 200.

The capacitance sensor 300 may be also electrically connected to the alarm 400 and may send the sensor signal to the alarm 400 according to the change in capacitance detected. For example, the capacitance sensor 300 may create and send a sensor signal to the alarm 400 when a threshold change in capacitance is measured. In certain embodiments, the threshold change in capacity corresponds to the presence of a conductive underlying substrate near or in contact with the drill bit 220. For example, in certain embodiments, the capacitive-sensing paint borer 10 may be configured to drill through a variety of paint or film layers disposed over an underlying metallic or composite substrate, and the predetermined threshold may be selected to differentiate between the paint or film layers and the underlying substrate. In other embodiments, the predetermined threshold is such that the capacitance sensor creates the sensor signal when the drill bit contacts the underlying substrate, and not when it is in contact with the paint or film layers, and the predetermined threshold corresponds to a capacitive coupling provided by a metallic or composite substrate material. In certain embodiments, the predetermined threshold is above a capacitive coupling provided by a paint or film layer disposed over a metallic or composite material. For example, the threshold change in capacitance may corresponds to direct contact with a material with a significant dielectric constant, such as an underlying conductive composite material, like carbon-fiber laminates, or metallic substrates, such as aluminum or aluminum alloys. In some embodiments, the threshold change in capacitance does not corresponds to mere proximity to a conductive material or a material with a significant dielectric constant. In certain embodiments, non-conductive composite substrates, such as fiberglass, do not meet the predetermined threshold. Similarly, in other embodiments, non-conductive paints or films also do not meet the predetermined threshold. As used herein, the term significant dielectric constant may indicate a dielectric constant of 5 or greater or of 10 or greater. For example, in one embodiment, a significant dielectric constant means a dielectric constant of 5 or greater, 10 or greater, 15 or greater, 20 or greater, or 30 or greater.

The alarm 400 is electrically connected to the capacitance sensor 300 and is configured to produce an alarm signal upon receipt of a sensor signal from the capacitance sensor 300. In one embodiment, the alarm 400 includes one or more sound sources 410 and produces an audible alarm signal upon receipt of a sensor signal from the capacitance sensor 300. In another embodiment, the alarm 400 includes one or more light sources 420 and produces a visual alarm signal upon receipt of a sensor signal from the capacitance sensor 300.

In one embodiment, the capacitive-sensing paint borer 10 operates as follows: the capacitive-sensing paint borer 10 is turned on, and power is supplied from the power source 100 to the drill 200 and the capacitance sensor 300.

In some embodiments, the capacitive-sensing paint borer 10 is configured to turn on and off according to a position of the drill 200. For example, a lever actuated electrical switch 255 may be used to provide electrical power to the drill 200 and/or the capacitance sensor 300 according to a position of the drill 200 within the capacitive-sensing paint borer 10.

The drill motor 210 drives the drill bit 220 and the capacitive-sensing paint borer 10 is used to drill through one or more paint or film layers over an underlying substrate. As the drill bit 220 drills through the paint or film layers, the capacitance sensor 300 measures a change in a capacitive load caused by the material in contact with the drill bit 220. In one embodiment, the underlying substrate is a conductive material or a material with a significant dielectric constant, whereas the paint or film layers are non-conductive or have a low dielectric constant. Accordingly, when the drill bit 220 drills through the paint or film layers and contacts the underlying substrate, the capacitance sensor 300 measures the associated change in capacitance detected and sends a sensor signal to the alarm 400 if a threshold change in capacitance is measured. The alarm 400 then produces an audio and/or visual alarm signal to inform a user to remove the capacitive-sensing paint borer 10 away from the underlying substrate to minimize penetration by the drill bit 220. In some embodiments, it may be preferable to have the drill 200 under power as it is removed away from the underlying substrate to minimize an amount of paint residue or burrs left in the bore hole.

Figure 2:
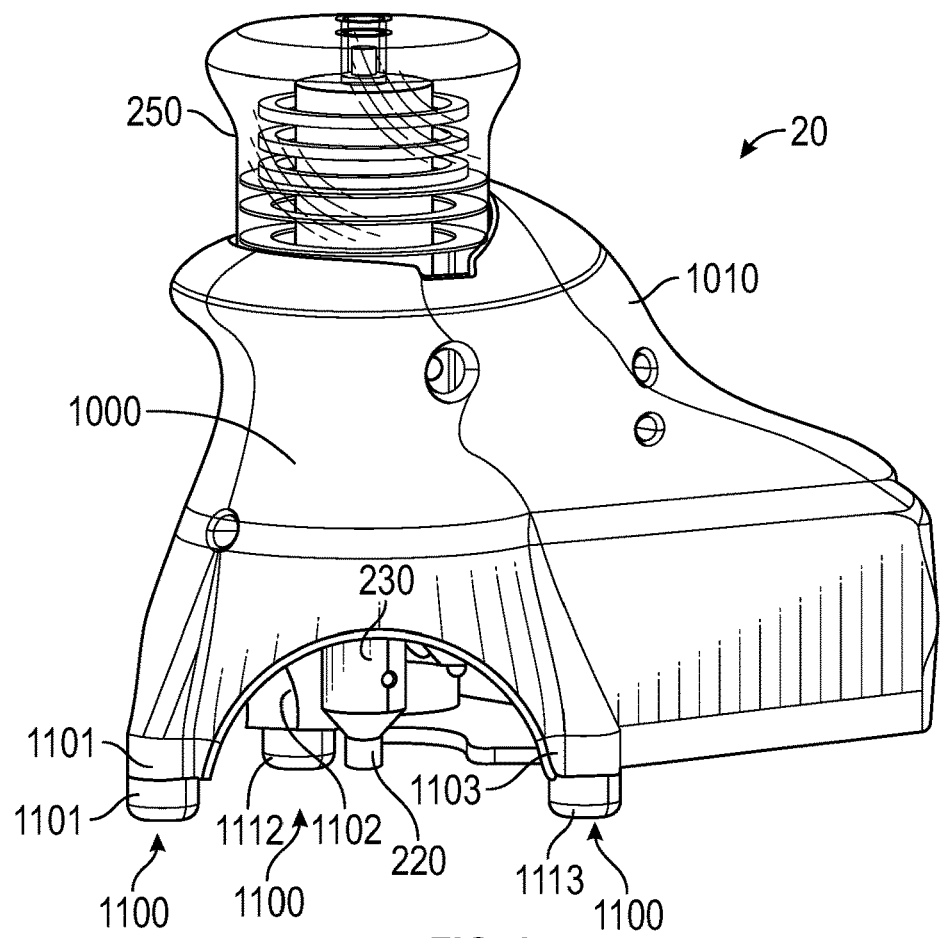
FIG. 2 illustrates a boring apparatus according to another embodiment.
Figure 3:
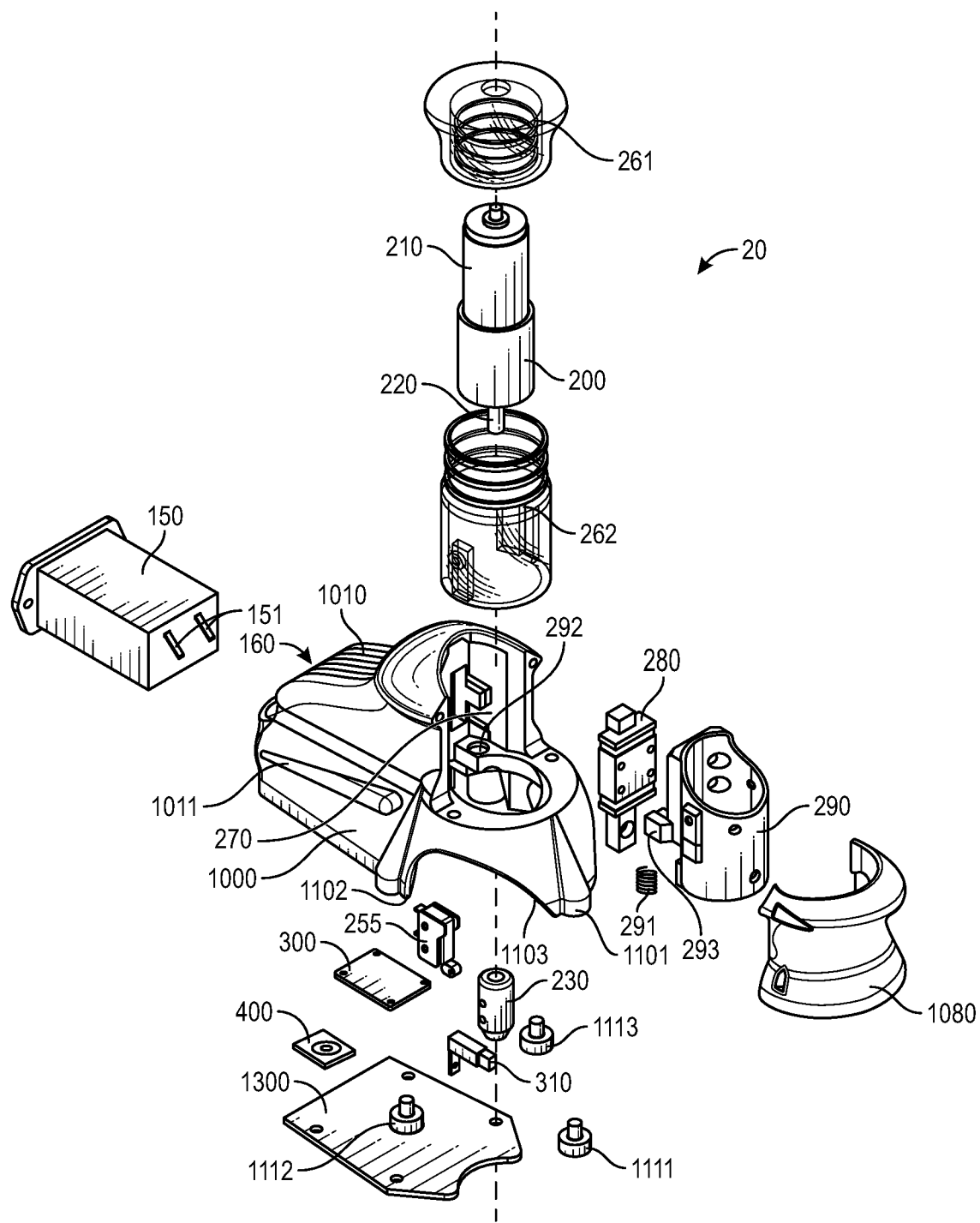
FIG. 3 illustrates an exploded component view of the boring apparatus of FIG. 2.
Figure 4:
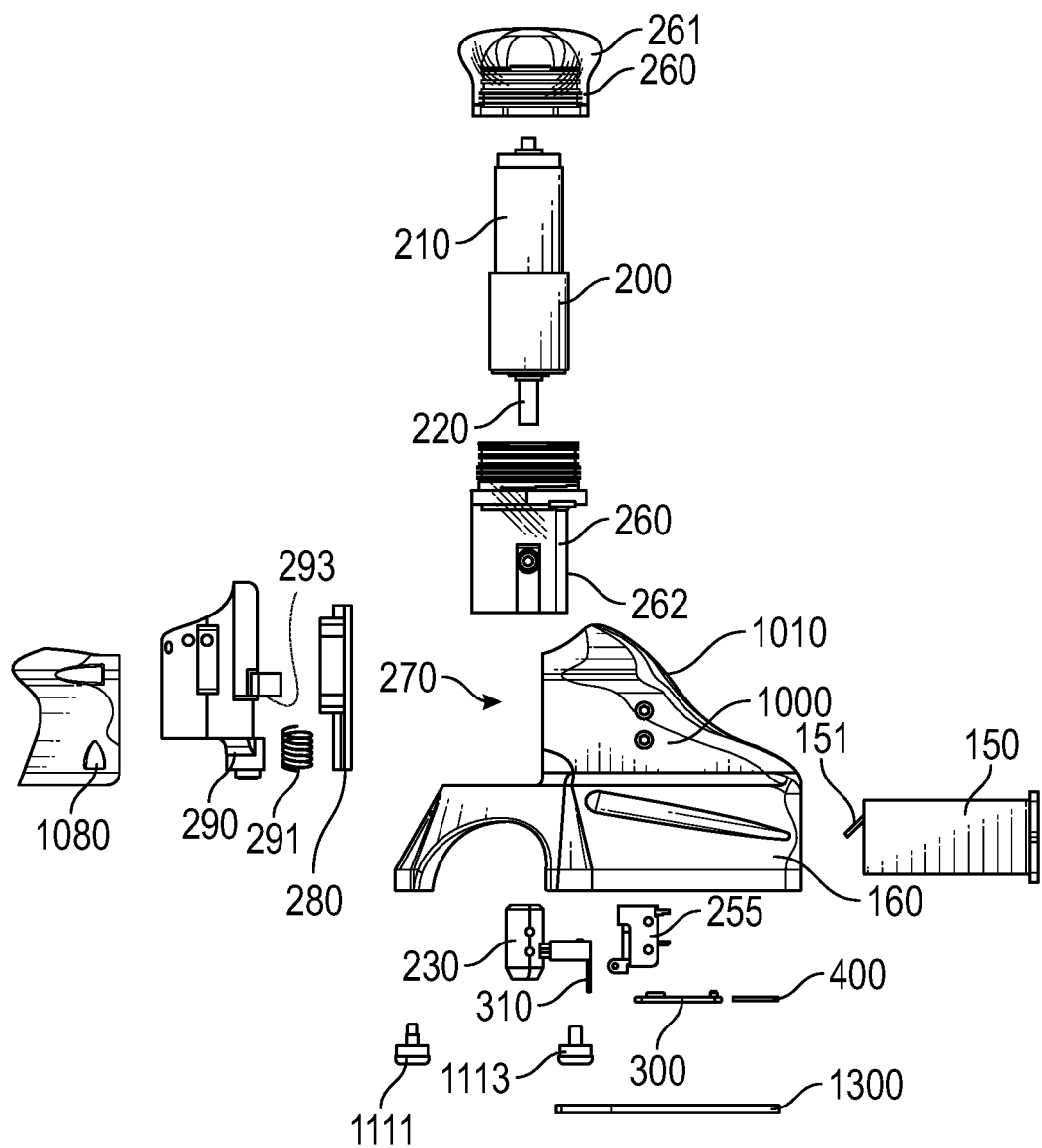
FIG. 4 illustrates an exploded component view of the boring apparatus of FIG. 2.

FIG. 2 illustrates a capacitive-sensing boring apparatus according to another embodiment. FIGS. 3-4 illustrate exploded component views of the capacitive-sensing boring apparatus of FIG. 2.

As illustrated in FIGS. 2-4, a capacitive-sensing paint borer 20 includes a body 1000, a power source assembly 150, a drill assembly 250, a capacitance sensor 300, and an alarm 400.

As illustrated in FIG. 2, in some embodiments, the body 1000 is contoured to facilitate handling of the capacitive-sensing paint borer 20. For example, the body 1000 may include an ergonomically contoured surface 1010 to facilitate handling of the capacitive-sensing paint borer 20. That is, the body 1000 may be designed to allow a user to comfortably hold and operate the capacitive-sensing paint borer 20 at multiple angles and with differently-sized hands. For example, the body 1000 may include a ridge 1011 to provide a reliable gripping edge while carrying the capacitive-sensing paint borer 20.

In one embodiment, the capacitive-sensing paint borer 20 is designed for single-hand manipulation, and the capacitive-sensing paint borer 20 may be sized, and the contoured surface 1010 may be configured, to fit in an operator's single hand, and allow operation of the drill assembly 250 with one or more fingers of a single hand holding the capacitive-sensing paint borer 20.

Aircraft surfaces may be both flat and contoured. Accordingly, in some embodiments, the body 1000 includes a base configured to rest on both flat and contoured surfaces. For example, the body 1000 may include a three-point base 1100 configured to stably rest on both flat and contoured surfaces. In one embodiment, the three-point base 1100 is formed by three legs 1101, 1102, and 1103, coupled to three contact points 1111, 1112, and 1113, respectively. The contact points 1111, 1112, and 1113, may be formed of non-skid materials. For example, the contact points 1111, 1112, and 1113, may be embodied as rubber feet, such as butyl rubber. In certain embodiments, the contact points 1111, 1112, and 1113, may be embodied as spherical rubber fit comprising hard rubber or silicone. In other embodiments, the three-point base 1100 may be configured to allow visual inspection of the drill bit 220 impact area.

As illustrated in FIGS. 2-4, the body 1000 may be configured to hold all the other components of the capacitive-sensing paint borer 20. For example, the body 1000 may include a power compartment 160 to hold the power source assembly 150, a drill compartment 270 and a cover 1080 to hold the drill assembly 250, and a bottom plate 1300 to enclose the capacitance sensor 300 and the alarm 400.

The power source assembly 150 may be configured to hold a power source 100. In one example, the power source 100 is a 9V battery. In other examples, the power source is a rechargeable battery. The power source assembly 150 may also include electrical contacts 151 to facilitate an electrical connection between the power source 100 and the rest of the capacitive-sensing paint borer 20, and/or to facilitate recharging of the power source 100 inside the power source assembly 150. For example, the power source 100 may be electrically connected and may supply power to the drill assembly 250 and/or the drill motor 210, the capacitance sensor 300, and the alarm 400.

The drill assembly 250 includes a drill 200 including a drill motor 210 and a drill bit 220. In certain embodiments, the drill assembly 250 may also include other components designed to control a movement of the drill motor 210 and a drill bit 220, and/or to protect these components.

That is, the drill assembly 250 may be configured to ensure a straight and/or symmetrical bore hole. For example, the drill assembly may also include a drill housing 260, a linear guide rail 280, and a carriage 290, to control a movement of the drill motor 210 and a drill bit 220.

The drill housing 260 may include a housing body 262 and a housing cover 261. The drill housing 260 may be configured to at least partially enclose the drill motor 210 and/or the drill bit 220. For example, the housing cover 261 may be configured as a screw cover for the housing body 262, enclosing at least part of the drill motor 210. In some embodiments, the drill housing 260 is configured to move vertically during operation. That is, to move the drill motor 210 and the drill bit 220 vertically towards and away from a target surface during operation. In one embodiment, the housing cover 261 is configured to protrude above the body 1000 when installed, and the drill housing 260 is configured to move down upon downward pressure from an operator's finger on the housing cover 261 to move the drill bit 220 down into contact with the target surface.

The carriage 290 may be configured to hold the drill housing 260 within the body 1000 and may also be configured to couple to the linear guide rail 280 to control a movement of the drill housing 260 during operation.

The linear guide rail 280 may be disposed within the drill compartment 270 and may be configured to couple to the carriage 290 to limit a lateral movement or twisting of the drill assembly 250 or the drill bit 220 during operation. For example, the linear guide rail 280 may be stably coupled to the body 1000 by, for example, an interference fit. The carriage 290 may be then coupled to the linear guide rail 280. In certain embodiments, the linear guide rail 280 provides one or more vertical rails upon which the carriage 290 may be mounted on to guide a vertical movement of the carriage 290, and thus, of the drill housing 260. The vertical rails serve to limit a lateral movement or twisting of the carriage 290 during vertical movement of the carriage 290 and/or the drill housing 260.

In certain embodiments, the carriage 290 is biased towards an upward position away from the target surface. For example, the carriage 290 may include one or more springs 291 mounted between body spring contact point 292 and carriage spring contact point 293 to exert an upwards pressure on the carriage 290. In certain embodiments, an operator presses the housing cover 261 downwards against the upward pressure of the springs 291 to bring the drill bit 220 into contact with the target surface.

In certain embodiments, a vertical movement of the carriage 290 controls the supply of power to the drill motor 210. For example, the drill assembly 250 may include a lever actuated electrical switch 255.

The lever actuated electrical switch 255 controls a power source 100 from the power source 100 to the drill motor 210 depending on the position of the carriage 290. For example, the lever actuated electrical switch 255 may be positioned within the body 1000 and relative to the linear guide rail 280 such that an electrical connection between the power source 100 and the drill motor 210 is only created and/or maintained when the carriage 290 is in a lower position relative to the linear guide rail 280.

That is, in certain embodiments, as an operator pushes the drill housing 260 downwards, electrical contacts on the carriage 290 come into contact with the lever actuated electrical switch 255 to create an electrical connection between the power source 100 and the drill motor 210 powering the drill motor. Similarly, when the downward pressure stops, the upward pressure of the one or more springs 291 moves the carriage 290 upwards, breaking the electrical connection between the electrical contacts on the carriage 290 and the lever actuated electrical switch 255, and cutting off power to the drill motor 210.

In some embodiments, the drill assembly 250 may also include a connector 230 to electrically connect the drill bit 220 to the capacitance sensor 300. For example, the connector 230 may be embodied as a conductive collar or collet surrounding the drill bit 220. In one embodiment, the connector 230 is a brass collet configured to hold or surround the drill bit 220.

In certain embodiments, the capacitance sensor 300 may include an integrated circuit configured to measure capacitance mounted on or enclosed by the bottom plate 1300. The capacitance sensor 300 may be electrically connected to the drill assembly 250 and/or the drill bit 220 and may measure a change in the capacitance or capacitive load associated with the material in contact with the drill bit 220. For example, the capacitance sensor 300 may include an electrical brush 310 to contact the connector 230 to establish an electrical connection and measure a capacitive load of a material in contact with the drill bit 220.

In certain embodiments, the alarm 400 may be embodied as a speaker configured to issue an audible alarm signal upon receipt of a sensor signal from the capacitance sensor 300. For example, the capacitance sensor 300 may be electrically connected to the alarm 400 and the capacitance sensor 300 may send a sensor signal to the alarm 400 when the capacitance sensor 300 detects a significant change in the capacitive load, such as that associated with conductive composite material or metallic substrates. As described above, the capacitance sensor 300 may be configured to send the sensor signal to the alarm 400 only when a predetermined threshold is measured.

The present disclosure has been described with reference to exemplary embodiments. Although a few embodiments have been shown and described, it will be appreciated by those skilled in the art that changes may be made in these embodiments without departing from the principles and spirit of preceding detailed description. It is intended that the present disclosure be construed as including all such modifications and alterations insofar as they come within the scope of the appended claims or the equivalents thereof

What is claimed is:

1. A boring apparatus comprising:
a drill comprising a drill bit;
a capacitance sensor having a ground plane and a threshold capacitance; and
an alarm;
wherein the capacitance sensor is electrically connected to the drill bit and the capacitance sensor detects a change in the electrical field between the drill bit and the capacitance sensor's ground plane to detect a change in capacitance associated with a substrate material in proximity to the drill bit;
wherein the capacitance sensor creates a sensor signal when the detected change in capacitance is greater than the threshold capacitance of the capacitance sensor; and
wherein the capacitance sensor is electrically connected to the alarm, and wherein the alarm creates an alarm signal upon receipt of the sensor signal from the capacitance sensor.

2. The boring apparatus of claim 1, further comprising:
a power source electrically connected to the drill, the capacitance sensor, and the alarm to supply electrical power to the drill, the capacitance sensor, and the alarm.

3. The boring apparatus of claim 1, wherein the boring apparatus contains the drill, the capacitance sensor, and the alarm within a contoured body, and the boring apparatus is configured for single-hand manipulation.

4. The boring apparatus of claim 1, wherein the change in capacitance greater than the threshold corresponds to direct contact with a material with a significant dielectric constant.

5. The boring apparatus of claim 1, wherein the change in capacitance greater than the threshold corresponds to direct contact with a conductive material.

6. The boring apparatus of claim 1, wherein the alarm creates at least one of an audible and a visual alarm signal upon receipt of the sensor signal.

7. The boring apparatus of claim 1, further comprising a connector to electrically connect the drill bit to the capacitance sensor.

8. The boring apparatus of claim 7, wherein the connector comprises a collet supporting the drill bit.

9. The boring apparatus of claim 8, wherein the capacitance sensor comprises an electrical brush electrically connected to the connector to create an electrical connection between the capacitance sensor and the drill bit.

10. A capacitive-sensing boring apparatus, comprising:
a body;
a power source assembly;
a drill assembly comprising a drill bit;
a capacitance sensor; and
an alarm,
wherein the power source assembly provides power to the drill assembly, the capacitance sensor, and the alarm, and wherein the capacitance sensor is configured to measure a change in capacitance between the drill bit and an internal reference plane of the capacitance sensor according to a change in capacitive load associated with a material in proximity to the drill bit, and the capacitance sensor creates a sensor signal when a threshold change in capacitance is detected, and
wherein the alarm creates an alarm signal upon receipt of the sensor signal.

11. The capacitive-sensing boring apparatus of claim 10, wherein the body comprises a base configured to stably rest upon contoured surfaces.

12. The capacitive-sensing boring apparatus of claim 11, wherein the base is a three-point base.

13. The capacitive-sensing boring apparatus of claim 10, wherein the material in proximity to the drill bit comprises a metallic or composite material and the threshold change in capacitive load corresponds to direct contact between the drill bit and the metallic or composite material.

14. The capacitive-sensing boring apparatus of claim 10, wherein the material in proximity to the drill bit comprises a metallic or composite material and the threshold change in capacitive load corresponds to proximity between the drill bit and the metallic or composite material.

15. The capacitive-sensing boring apparatus of claim 10, wherein the threshold change in capacitive load corresponds to direct contact between the drill bit and a material with a dielectric constant of 5 or greater.

16. A method of boring through one or more coating layers disposed over a metallic or composite substrate, comprising:
boring a hole through one or more coating layers deposited over the metallic or composite substrate;
wherein the metallic or composite substrate has a dielectric constant of 5 or greater and is capable of providing a significant capacitive load, and
wherein the boring of the hole through the one or more coating layers comprises detecting a change in a capacitance associated with the metallic or composite substrate to prevent or reduce boring into the metallic or composite substrate.

17. The method of claim 16, wherein the detecting of the change in the capacitance corresponds to direct contact with the metallic or composite substrate during the boring of the hole through the one or more coating layers.

18. The method of claim 17, further comprising:
creating an alarm signal when the change in the capacitance is detected.

19. The method of claim 16, further comprising:
measuring at the hole bored through the one or more coating layers a visible width of the one or more coating layers deposited over the substrate to determine their thickness.

20. The method of claim 16, wherein the boring of the hole uses a boring apparatus according to claim 1.

* * * * *